# 2,830,928
INSECTICIDAL COMPOSITIONS

Robert J. Harker, Terre Haute, Ind., assignor to Commercial Solvents Corporation, Terre Haute, Ind., a corporation of Maryland No Drawing. Application April 27, 1954
Serial No. 426,040

10 Claims. (Cl. 167—30)

My invention relates to insecticidal compositions. More particularly, it relates to residual deposits of such compositions with enhanced immediate activity.

Insecticides as a group often vary widely in physical characteristics. Most insecticides are crystalline compounds. However, some of the more recently developed insecticides take the form of viscous oils in the technical grades. These are generally marketed to the insecticide trade as mobile solutions in organic solvents, and sometimes with added emulsifiers to render them suitable for mixing with water. For use, these insecticides are generally mixed with powdered inert ingredients to form powders for dusting, are dissolved in additional organic solvents for spraying, or, with added emulsifiers, are sprayed as emulsions in water.

Among the recently developed insecticides the technical grades of which occur as viscous oils are 2-nitro-1,1-bis-(p-chlorophenyl)propane and 2-nitro-1,1-bis-(p-chlorophenyl)butane, and mixtures of these two insecticides which are produced in the manner set forth in United States Patent 2,516,186, issued to H. B. Hass and R. T. Blickenstaff on July 25, 1950.

It has now been found that these particular insecticides, when dissolved in organic solvents and sprayed on surfaces to afford protection from insects, are not immediately effective as insecticides, but have to undergo a period of conditioning before reaching their full effectiveness.

I have now discovered an insecticidal composition of enhanced immediate activity which comprises an insecticide selected from the group consisting of 2-nitro-1,1-bis-(p-chlorophenyl)propane, 2-nitro-1,1-bis-(p-chlorophenyl)butane, mixtures of 2-nitro-1,1-bis-(p-chlorophenyl)propane and 2-nitro-1,1-bis-(p-chlorophenyl)butane, and mixtures of 2-nitro-1,1-bis-(p-chlorophenyl)propane, 2-nitro-1,1-bis-(p-chlorophenyl)butane, and 1,1,1-trichloro-2,2-bis-(p-chlorophenyl)ethane and a vegetable oil selected from the group consisting of non-drying and semi-drying oils in a mutual organic solvent. This composition has been found not to be subject to the objection of previous compositions in that it does not require any period of conditioning after it is deposited, but is immediately effective to its fullest extent as an insecticide.

My compositions consist of the oily, viscous, insecticides or mixtures thereof and a very slow-drying vegetable oil in a mutual organic solvent. As the active ingredient of my new compositions I can use any of the following insecticides: 2-nitro-1,1-bis-(p-chlorophenyl)propane, 2-nitro-1,1-bis-(p-chlorophenyl)butane, a mixture of 2-nitro-1,1-bis-(p-chlorophenyl)propane and 2-nitro-1,1-bis-(p-chlorophenyl)butane, and a mixture of 2-nitro-1,1-bis-(p-chlorophenyl)butane, 2-nitro-1,1-bis-(p-chlorophenyl)propane and 1,1,1-trichloro-2,2-bis-(p-chlorophenyl)ethane. As oils suitable for use in my composition I can use any of the non-drying or semi-drying vegetable oils, such as cottonseed oil, peanut oil, soybean oil, corn oil, castor oil, sesame oil and palm oil. Solvents suitable for use in my insecticidal compositions include any organic solvent which will dissolve both the active insecticide and the oil added, such as benzene, xylene, kerosene, petroleum naphthas, and light hydrocarbons in general.

The active insecticidal ingredient may be included in the composition in any desired concentration so long as sufficient organic solvent is present to render the agent mobile. The vegetable oil ingredient can be added in amounts of from about 5% to about 60% of the weight of the active insecticidal ingredient. I prefer to include a vegetable oil in an amount ranging from about 20% to about 40% of the weight of the active insecticidal ingredient. An organic solvent can be included in any desired amount so long as su;cient solvent is present to make the other ingredients mobile. I have found it desirable to include the organic solvent in a concentration of at least about 20% of the total composition.

The following examples serve to illustrate my invention, but I do not intend to be limited to the disclosed compounds or amounts. The scope of my invention is as defined in this specification and appended claims.

EXAMPLE I

Liquid concentrates of a mixture of 2 parts of 2-nitro-1,1-bis-(p-chlorophenyl)butane and 1-part of 2-nitro-1,1-bis-(p-chlorophenyl)propane were prepared containing 25% of the mixed insecticides, 10% of a non-drying or semi-drying vegetable oil in some of the samples, and the remainder an organic solvent. For spraying there was added to these concentrates 2% by weight of a standard commercial emulsifier (Triton X-155), and they were then diluted with 4 volumes of water and sprayed on plywood panels. The spray was adjusted to deposit 200 milligrams of the active insecticide per square foot of the panel. Three days after spraying groups of 100 adult female houseflies of an insecticide-resistant strain, *M. domestic*, Roberds resistant strain, were exposed to the plywood panels containing the residual deposits. The flies were retained under petri dishes 4 inches in diameter for periods of 30 minutes in contact with the plywood panels. At the end of the 30 minute exposure period the flies were transferred to clean wire cages and the percent mortalities determined at the end of 24 hours. This procedure was repeated with new groups of the same strain of houseflies after the residual deposits had aged for the periods indicated, i. e., one, two, three, four, and seven weeks. The results of exposures of each group of flies to the different test deposits of increasing age are set out in Table I below as percent mortalities 24 hours after each exposure.

*Table I*

| Insecticide | | Solvent | Additive | | 24 hour mortality (percent) | | | | | |
|---|---|---|---|---|---|---|---|---|---|---|
| Type | Dosage mg./ft.[2] | | Oil [2] | Dosage, mg./ft.[2] | 3 days | 1 wk. | 2 wks. | 3 wks. | 4 wks. | 7 wks. |
| A [1] | 200 | Xylene | | | 0 | 0 | 2 | 0 | 0 | 42 |
| A | 200 | LHC [3] | | | 12 | 0 | 4 | 5 | 5 | 25 |
| A | 200 | LHC [3] | C. S. O. | 80 | 47 | 22 | 39 | 36 | 75 | 40 |
| A | 200 | LHC [3] | P. O. | 80 | 93 | 69 | 38 | 22 | 59 | 31 |
| A | 200 | LHC [3] | S. O. | 80 | 73 | 54 | 51 | 25 | 83 | 98 |

[1] A is a mixture of 1 part 2-nitro-1,1-bis-(p-chlorophenyl)propane and 2 parts 2-nitro-1,1-bis-(p-chlorophenyl)butane.
[2] C. S. O. is cottonseed oil; P. O. is peanut oil; S. O. is soybean oil.
[3] LHC is a light hydrocarbon solvent (Sovacide 544-G of Socony-Vacuum Oil Company).

EXAMPLE II

The liquid concentrate of a mixture of 1 part of a 1:2 mixture of 2-nitro-1,1-bis-(p-chlorophenyl)propane and 2-nitro-1,1-bis-(p-chlorophenyl)butane and 1 part of 1,1,1-trichloro-2,2-bis-(p-chlorophenyl)ethane was prepared containing 50% of the mixed insecticide, 10% of a non-drying or semi-drying vegetable oil in some of the samples, and the remainder an organic solvent. For spraying there was added to this concentrate 2% by weight of a standard commercial emulsifier (Triton X-155), and they were then diluted with 4 volumes of water and sprayed on plywood panels. The spray was adjusted to deposit 400 mg. of the active insecticides per square foot of the panel. Groups of one hundred adult female houseflies of *M. domestica*, Roberds resistant strain, were exposed in the same manner as set out in Example I above to these residual deposits for a 30 minute period. The results of exposures to the different residual deposits at the indicated ages of the deposits are set out in Table II below as percent mortality in each group of 100 flies 24 hours after exposure.

Table III

FLY POPULATIONS PER SQUARE YARD

| Days after treatment | Barn A [1] | | Barn B [2] | | Untreated barn | |
|---|---|---|---|---|---|---|
| | Inside | Outside | Inside | Outside | Inside | Outside |
| Before spraying | 20.8 | 133 | 155 | 38 | 446 | 235 |
| 2 | 0.3 | 2 | 2 | 0 | | |
| 5 | 0.2 | 6 | 5 | 2 | | |
| 8 | 4 | 13 | 12 | 3 | | |
| 14 | 9 | 43 | 8 | 4 | 388 | 217 |
| 20 | 8 | 21 | 4 | 3 | 631 | 550 |
| 26 | 15 | 47 | 9 | 6 | 907 | 920 |
| 35 | 8 | 25 | 10 | 4 | 345 | 1,286 |
| 38 | 9 | 22 | 10 | 23 | | |
| 44 | | | | | 365 | 840 |
| 49 | 11 | 11 | 10 | 5 | 238 | 672 |
| 53 | 4 | 21 | 6 | 5 | | |
| 62 | | | | | 289 | 860 |

[1] Barn A treated with 25% 2-nitro-1,1-bis-(p-chlorophenyl)propane and butane emulsion.
[2] Barn B treated with 25% 2-nitro-1,1-bis-(p-chlorophenyl) propane and butane and 25% 1,1,1-trichloro-2,2-bis(p-chlorophenyl)ethane emulsion.

Table II

| Insecticide | | Solvent | Additive | | 24 hour mortality (percent) | | | | | |
|---|---|---|---|---|---|---|---|---|---|---|
| Type | Dosage mg./ft.² | | Oil [2] | Dosage, mg./ft.² | 3 days | 1 wk. | 2 wks. | 3 wks. | 4 wks. | 7 wks. |
| B [1] | 400 | Xylene | | | 0 | 9 | 91 | 100 | 95 | 100 |
| B | 400 | LHC [3] | | | 19 | 4 | 19 | 39 | 95 | 99 |
| B | 400 | Xylene | C. S. O. | 80 | 99 | 94 | 100 | 100 | 100 | 100 |
| B | 400 | LHC [3] | P. O. | 80 | 91 | 65 | 47 | 56 | 98 | 100 |
| B | 400 | LHC | S. O. | 80 | 100 | 100 | 93 | 97 | 100 | 100 |

[1] B is a mixture of 1 part of a 1 to 2 mixture of 2-nitro-1,1-bis-(p-chlorophenyl)propane and 2-nitro-1,1-bis-(p-chlorophenyl)butane and 1 part 1,1,1-trichloro-2,2-bis-(p-chlorophenyl)ethane.
[2] C. S. O. is cottonseed oil; P. O. is peanut oil; S. O. is soybean oil.
[3] LHC is a light hydrocarbon solvent, Sovacide 544-G, a commercial product of Socony-Vacuum Oil Company.

EXAMPLE III

Field tests of my new insecticidal compositions were conducted which confirmed their effectiveness against the strains of flies normally occurring in and about dairy barns, areas of high fly infestations. These field tests were conducted in three operating dairy barns, including one in a location favoring a high potential rate of re-infestation, one favoring a low potential rate of re-infestation, and one in a location having a medium potential rate of re-infestation. The dairy barn in the medium potential rate location was untreated and thus served to indicate normal fly populations. The dairy barn in the low potential rate location was sprayed at the rate 200 mg. of insecticide per square foot of surface area with an emulsion of the following percentage composition in 3 volumes of water: 25% a 1:2 mixture of 2-nitro-1,1-bis-(p-chlorophenyl)propane and 2-nitro-1,1-bis-(p-chlorophenyl)butane, 10% cottonseed oil, 2% commercial emulsifier, and 63% xylene. The high potential rate dairy barn was sprayed at the rate of 400 mg. of all insecticides per square foot of surface area with an emulsion of the following percentage composition in 3 volumes of water: 25% a 1:2 mixture of 2-nitro-1,1-bis-(p-chlorophenyl)propane and 2-nitro-1,1-bis-(p-chlorophenyl)butane, 25% 1,1,1-trichloro-2,2-bis-(p-chlorophenyl)ethane, 10% cottonseed oil, 2% commercial emulsifier, and 38% xylene. Fly populations per square yard were determined at the indicated intervals after spraying both inside and outside immediately adjacent to the three dairy barns. The results recorded in Table III below are the average of the four highest counts taken out of 35 samples on each recorded reading.

My new insecticidal compositions can be utilized as sprays after dilution. They may be further diluted with additional organic solvents to the desired concentration for spraying on any inert surface. They can also be diluted with water after the inclusion of any suitable emulsifiers to disperse the organic solvent in the water. This latter is the preferred method of application of my new composition to growing plants.

Now having described my invention what I claim is:

1. An insecticidal composition of enhanced immediate activity which comprises an insecticide selected from the group consisting of 2-nitro-1,1-bis-(p-chlorophenyl)propane, 2-nitro-1,1-bis-(p-chlorophenyl)butane, mixtures of 2-nitro-1,1-bis-(p-chlorophenyl)propane and 2-nitro-1,1-bis-(p-chlorophenyl)butane, and mixtures of 2-nitro-1,1-bis-(p-chlorophenyl)propane, 2-nitro-1,1-bis-(-p-chlorophenyl)butane, and 1,1,1-trichloro-2,2-bis-(p-chlorophenyl)ethane and from about 5 to 60% by weight, based on the weight of the active insecticidal component, of a slow-drying vegetable oil selected from the group consisting of non-drying and semi-drying oils in a mutual organic solvent.

2. An insecticidal composition of enhanced immediate activity which comprises a mixture of 2-nitro-1,1-bis-(p-chlorophenyl)propane and 2-nitro-1,1-bis-(p-chlorophenyl)butane and a slow-drying vegetable oil selected from the group consisting of non-drying and semi-drying oils in a mutual organic solvent.

3. The composition of claim 2 wherein the vegetable oil is peanut oil.

4. The composition of claim 2 wherein the vegetable oil is soybean oil.

5. An insecticidal composition of enhanced immediate activity which comprises a mixture of 2-nitro-1,1-bis-(p-chlorophenyl)propane, 2-nitro-1,1-bis-(p-chlorophenyl)butane and 1,1,1-trichloro-2,2-bis-(p-chlorophenyl)ethane and from about 5 to 60% by weight, based on the weight of the active insecticidal component, of a slow-drying vegetable oil selected from the group consisting of non-drying and semi-drying oils in a mutual organic solvent.

6. The composition of claim 5 wherein the vegetable oil is cottonseed oil.

7. The composition of claim 5 wherein the vegetable oil is soybean oil.

8. The composition of claim 5 wherein the vegetable oil is peanut oil.

9. In the manufacture of spraying insecticides wherein a mobile liquid insecticidal solution is produced by dissolving in an organic solvent an insecticide selected from the group consisting of 2-nitro-1,1-bis-(p-chlorophenyl)propane, 2-nitro-1,1-bis-(p-chlorophenyl)butane, mixtures of 2-nitro-1,1-bis-(p-chlorophenyl)propane and 2-nitro-1,1-bis-(p-chlorophenyl)butane, and mixtures of 2-nitro-1,1-bis-(p-chlorophenyl)propane, 2-nitro-1,1-bis-(p-chlorophenyl)butane and 1,1,1-trichloro-2,2-bis-(p-chlorophenyl)ethane; the improvement which comprises incorporating in such a liquid solution from about 5 to 60% by weight, based on the weight of the active insecticidal component, of a slow-drying vegetable oil which is soluble in said organic solvent, whereby said insecticidal solutions reach their full insecticidal effectiveness immediately they are applied to a surface without requiring a preliminary period of conditioning.

10. In the protection of buildings from insects, the process which comprises applying to the walls of a building a coating of a liquid insecticide comprising an active insecticidal component selected from the group consisting of 2-nitro-1,1-bis-(p-chlorophenyl)propane, 2-nitro-1,1-bis-(p-chlorophenyl)butane, mixtures of 2-nitro-1,1-bis-(p-chlorophenyl)propane and 2-nitro-1,1-bis-(p-chlorophenyl)butane, and mixtures of 2-nitro-1,1-bis-(p-chlorophenyl)propane, 2-nitro-1,1-bis-(p-chlorophenyl)butane and 1,1,1-trichloro-2,2-bis-(p-chlorophenyl)ethane; said liquid insecticide having incorporated therein from about 5 to 60% by weight, based on the weight of the active insecticidal component, of a slow-drying vegetable oil and a mutual solvent for the active insecticidal component and the vegetable oil, whereby the insecticide achieves its full insecticidal effectiveness immediately without requiring a preliminary period of conditioning.

References Cited in the file of this patent

UNITED STATES PATENTS 2,516,186     Hass et al. _____ July 25, 1950

FOREIGN PATENTS 609,762     Great Britain _____ Oct. 6, 1948

OTHER REFERENCES

Ind. and Eng. Chem., December 1951, vol. 43, No. 12, pp. 2875–2878.

Soap and Sanitary Chemical, March 1947, p. 141.

Brown: Insect Control by Chemicals, 1951, p. 195.